United States Patent

[11] 3,624,653

| [72] | Inventors | Andrew J. Kelly<br>32 Vogel St., West Roxbury, Mass. 02132;<br>John J. Lynch, 45 Oakland Ave., Arlington,<br>Mass. 02174; Robert G. Steele, 33<br>Ridgeway Ave., Billerica, Mass. 01821 |
|------|-----------|---|
| [21] | Appl. No. | 859,438 |
| [22] | Filed     | Sept. 19, 1969 |
| [45] | Patented  | Nov. 30, 1971 |

[54] RADAR-REFLECTIVE BALLOONS
6 Claims, 1 Drawing Fig.

[52] U.S. Cl. .................................................... 343/18 B,
343/5 W
[51] Int. Cl. ........................................................ H01q 15/00

[50] Field of Search............................................ 343/5 W,
18 B, 793

[56] References Cited
UNITED STATES PATENTS

| 2,752,594 | 6/1956 | Link et al..................... | 343/18 B |
| 3,324,470 | 6/1967 | Morse .......................... | 343/18 B |

*Primary Examiner*—Malcolm F. Hubler
*Attorneys*—Metro Kalimon and William L. Baker

ABSTRACT: Metallized polymeric dipoles are affixed to the surface of balloons which are tracked by radar.

PATENTED NOV 30 1971   3,624,653
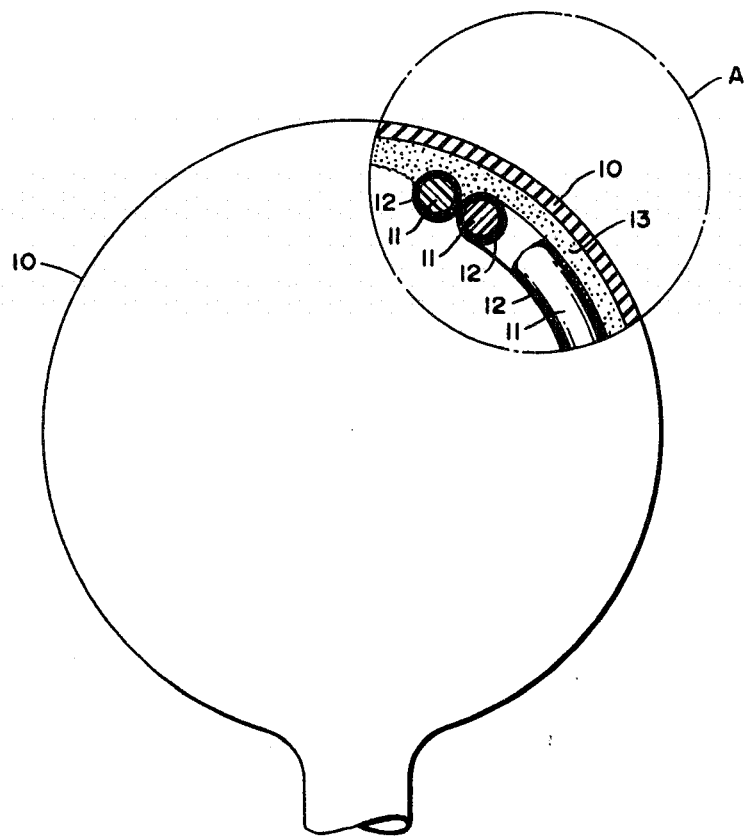
INVENTORS
ANDREW J. KELLY
JOHN J. LYNCH
ROBERT STEELE
BY *Metro Kalimon*
ATTORNEY

RADAR-REFLECTIVE BALLOONS

The present invention relates to balloons which are used to reflect radar signals, and more specifically to an improved radar-reflective balloon (Rabal) which is particularly suitable for use in obtaining wind data as determined by automatic radar tracking devices.

For many years data concerning winds aloft have been obtained by tracking balloons by radar. To obtain a suitable reflective signal, elastomeric balloons have been coated with metallic substances or filled with metal chaff.

While these prior art balloons have been used with success, it is frequently found that reflective radar signals have undergone considerable distortion or modulation. Such modulation is highly undesirable, particularly where automatic radar tracking gear is utilized.

It is, therefore, an object of the present invention to provide an improved radar-reflective balloon structure.

It is another object to provide a radar-reflective balloon which will reflect radar signals at a minimum of modulation.

These and still further objects of the present invention will become readily apparent to one skilled in the art from the following detailed description and examples.

Broadly, the invention contemplates an elastomeric balloon to which metallized organic polymeric dipoles have been affixed. The length of the dipole substantially corresponds to the half wave length or whole number multiple thereof of a radar signal which is to be reflected.

More specifically, it has been found that a superior radar-reflective balloon structure is provided when metallized organic polymer dipoles having a diameter of preferably less than about 0.125 inch and a length corresponding to the half wave length, or whole number multiple thereof, of the radar signal to be reflected are fixed to a surface of elastomeric balloon.

Balloons which are utilized as radar targets typically possess a diameter of from about 1½ to 8 feet when inflated at sea level. These balloons will have a weight of from about 100 to about 2,500 grams and a film thickness at sea level of from about 3 to 6 mils. Typical balloons used as radar targets are prepared from elastomeric films which may be prepared from natural or synthetic rubber materials. Preferred materials include natural rubber, neoprene and copolymers thereof.

The single FIGURE of the drawing illustrates the balloon of this invention showing a magnified sectional view A of the dipole arrangement.

The metallized organic polymer dipoles utilized in preparing the present reflective balloons are commercially available and generally comprise an extruded filament of an organic polymer, such as nylon, polyester, or polyolefin having a diameter of from about 0.003 to about 0.015 inch. The filament is coated with a metal such as silver, copper or aluminum wherein the thickness of the coating ranges from about 0.0001 to about 0.001 inch. Metallized nylon dipoles will preferably have a cut length which corresponds to one-half the length of the radar signal to be reflected, or a whole number multiple thereof. For example, if the wavelength of a signal to be reflected is 10 cm., the dipole will be cut to a length of ½×10 cm. or 5 cm.

Alternatively, the length of the dipole may be 1, 2, 3... times the wavelength. Typically lengths ranging from about 0.5 to about 10 cm. are generally contemplated.

To construct the radar-reflective balloons of the present invention, the metallized polymeric dipoles are affixed to at least one of the surfaces of the balloon, that is, the interior, exterior or both surfaces of the balloon. Preferably, the dipoles are affixed to the interior surface. The dipoles may be fixed using a thin coating of cement such as natural rubber dissolved in naphtha, neoprene dissolved in toluol, these polymers in latex form or any similar cementitious material.

While the dipoles are typically cemented to the balloon surface, it is also contemplated that the dipoles may be affixed using a thermobonding technique wherein heated dipoles at a temperature of 150° to 350° C. are pressed against the balloon surface under conditions suitable for bonding the dipoles thereto.

In a typically preferred balloon structure from about four to 30 dipoles are affixed per square foot of expanded balloon surface at sea level. Generally it is found that the weight of the dipoles range from about 0.1 to 0.7 gram per gram of balloon weight.

The present balloon possess flight characteristics which generally correspond to ordinary balloon structures of the same general diameter and weight. However, it is found that the present dipole-coated balloons will reflect a typical radar signal with much less modulation than an ordinary target balloon containing similar metal chaff in terms of weight.

Having described the general aspects of the present invention, the following examples are given to illustrate specific embodiments thereof.

EXAMPLE I

A neoprene balloon having a weight of 100 grams and an uninflated wall thickness of 4 mils was coated with metallized nylon dipoles by the following procedure:

Dipoles having a thickness of 0.008 inch and a length of 5 cm. were composed of nylon 11 having their surfaces coated with metallic silver powder 12. The dipoles were then affixed to the surface of the balloon by applying a neoprene-solvent cement 13 to the balloon film. Before the solvent evaporated, the metallized nylon chaff was pressed on the wetted film. After evaporation of the solvent a light coating of talc was applied to the balloon. The balloon was then turned inside out so the dipoles were positioned on the inside surface of the balloon. The finished balloon structure when inflated at sea level possessed a diameter of about 3 feet and the surface thereof contained 11 dipoles per square foot of area.

EXAMPLE II

The flying characteristics of the balloons in example I as illustrated by the following:

The radar tracking performances of balloons coated with 5 cm. metallized nylon chaff were compared against those with aluminum chaff having a similar initial length, Prior to release it was noted that most of the aluminum chaff was badly wrinkled due to the fact it has little flexural strength to resist distortion. This resulted in the end-to-end length of many pieces being less than the original 5cm. The end-to-end lengths were in fact randomized. This type of chaff (up to this time) was the standard material used in radar-reflective balloons. The random lengths of the standard aluminum chaff caused excessive modulation in the returned signal.

On the other hand, the metallized nylon dipole type chaff had relatively high flexural strength. There was little distortion of the dipoles in the film due to handling or packaging of the balloon. The original end-to-end lengths were maintained. Balloons with the metallized nylon dipoles caused relatively little modulation in the returned signal.

The balloons containing metallized nylon dipoles were released under the same conditions of inflation sizes on the same day as two with uncoated aluminum chaff. Although there was little difference in signal strength observed in all tests, the balloons with metallized nylon dipoles gave a better signal return having much less modulation. Consequently, there was less signal modulation induced erratic movement of the antenna during tracking of the balloons with coated nylon dipoles. This resulted in smoother, more realistic wind profiles of the lower atmosphere since there was relatively little spurious motion of the antenna. False motion of the antenna which is induced by excessive signal modulation will indicate wind motions that really do not exist.

The above examples illustrate that balloons having superior radar-reflective qualitites using the teachings of the present invention.

We claim:

1. A radar-reflective balloon which comprises an elastomeric balloon having metal-coated organic polymeric dipoles affixed to at least one surface of the balloon.

2. The balloon of claim 1 wherein the dipoles have a diameter of less than about 0.125 inch.

3. The balloon of claim 1 wherein the dipoles have a length corresponding to the one-half wavelength of the radar signal to be reflected and whole number multiples thereof.

4. The balloon of claim 1 wherein said dipoles are cemented to the surface of said balloon.

5. The balloon of claim 1 wherein the dipoles are coated with silver.

6. The balloon of claim 1 wherein the dipoles are metallized nylon dipoles.

* * * * *